United States Patent [19]

Geiger

[11] 4,091,712
[45] May 30, 1978

[54] SPINDLEHEAD WITH SPINDLE DRIVING MOTOR

[75] Inventor: Michael Geiger, Munich, Germany

[73] Assignee: Friedrich Deckel Aktiengesellschaft, Munich, Germany

[21] Appl. No.: 676,643

[22] Filed: Apr. 14, 1976

[30] Foreign Application Priority Data

May 14, 1975 Germany .............................. 2521447

[51] Int. Cl.² .......................................... B23B 47/26
[52] U.S. Cl. ................................... 90/11 F; 90/15 R; 90/DIG. 28; 408/235
[58] Field of Search ............ 90/11 F, DIG. 28, 11 A, 90/15 R; 408/235, 234, 128; 308/6 C; 51/166 MH, 166 TS

[56] References Cited

U.S. PATENT DOCUMENTS

| | | | |
|---|---|---|---|
| 2,118,387 | 5/1938 | Wolfle | 408/235 X |
| 3,757,637 | 9/1973 | Eich et al. | 90/11 D |
| 3,844,628 | 10/1974 | McCloskey | 308/6 C |

Primary Examiner—Z. R. Bilinsky
Attorney, Agent, or Firm—Blanchard, Flynn, Thiel, Boutell & Tanis

[57] ABSTRACT

A spindlehead arrangement having a headstock and a driving spindle motor mounted separately of each other for vertical movement on separate tracks. The headstock is capable of being removed from its set of supporting tracks without necessitating a removal of the spindle driving motor. A releasable connection is provided between the headstock and the spindle driving motor to facilitate a movement of the headstock and the spindle driving motor in unison along the track. A counterbalance weight is provided for counterbalancing the weight of the headstock and the weight of the spindle driving motor.

8 Claims, 2 Drawing Figures

SPINDLEHEAD WITH SPINDLE DRIVING MOTOR

FIELD OF THE INVENTION

The invention relates to a spindlehead, which is supported for feed movement along one of the axes of a tool machine, comprising a headstock and a spindle driving motor which is movable with the headstock.

BACKGROUND OF THE INVENTION

Spindleheads of the mentioned type are already known, in which the spindle driving motor is structurally integrated with the headstock. This means that the spindlehead becomes very heavy and that the guideways for the spindlehead are always loaded by the weight of the driving motor. Furthermore, in particular in the case of exchangeable spindleheads, each spindlehead must have its own driving motor, which is very expensive and makes the exchange operation more difficult.

It is the purpose of the present invention to produce a spindlehead of the above-mentioned type, in which the afore-mentioned disadvantages are avoided, namely in which the driving motor does not load the spindlehead guideways and which is exchangeable, without that the spindle driving motor must always also be exchanged.

This purpose is inventively attained in such a manner that the spindle driving motor is supported movably in direction of the feed movement of the headstock on separate guideways and is coupled with the headstock through a releasable carrier connection.

During operation the spindlehead behaves like an integrated unit of headstock and spindle driving motor, namely the spindle driving motor partakes in the movements of the headstock, so that the driving connection between motor and spindle is without any problems.

However, the spindle driving motor does thereby not load the highly exact spindle guideways, but same can be supported on separate, less exact guideways.

In exchanging the headstock, the carrier connection is released and the headstock alone is exchanged for another one. In the case of a spindlehead with a feed movement which is directed perpendicularly with respect to the direction of the spindle axis it is provided inventively, that the spindle driving motor is arranged behind the headstock in spindle axis direction. Thus the spindle driving motor moves on guideways which are arranged parallel with respect to the headstock guideways. This arrangements has the advantage, that the spindle driving motor does not limit the movement of the headstock.

The carrier connection can be constructed very simply. According to a characteristic of the invention, it is provided that the carrier connection is constructed as a jointed connection, which transmits forces only in carrying direction. Therewith, an exact alignment of both coupled parts is not necessary, small position inexactnesses, for example of the driving motor, are balanced out and do not result in reciprocal bracing.

A further development of the invention provides that the carrier connection consists of a finger which is arranged on the spindle driving motor — or a motor carrier —, which finger engages a fork piece which is arranged on the headstock or vice versa, and that in the two legs of the fork piece there are arranged setscrews having an approximately semispherical dome or free end, which setscrews can each be screwed against the finger.

In the case of a spindlehead with a vertical feed movement, it is possible according to a characteristic of the invention to provide a counterbalance weight for the spindle driving motor. The counterbalance weight, however, can also be designed for the entire unit which consists of the headstock and the spindle driving motor.

One exemplary embodiment of the invention is illustrated in the drawing and will be described more in detail hereinafter.

DETAILED DESCRIPTION

Figure 1:
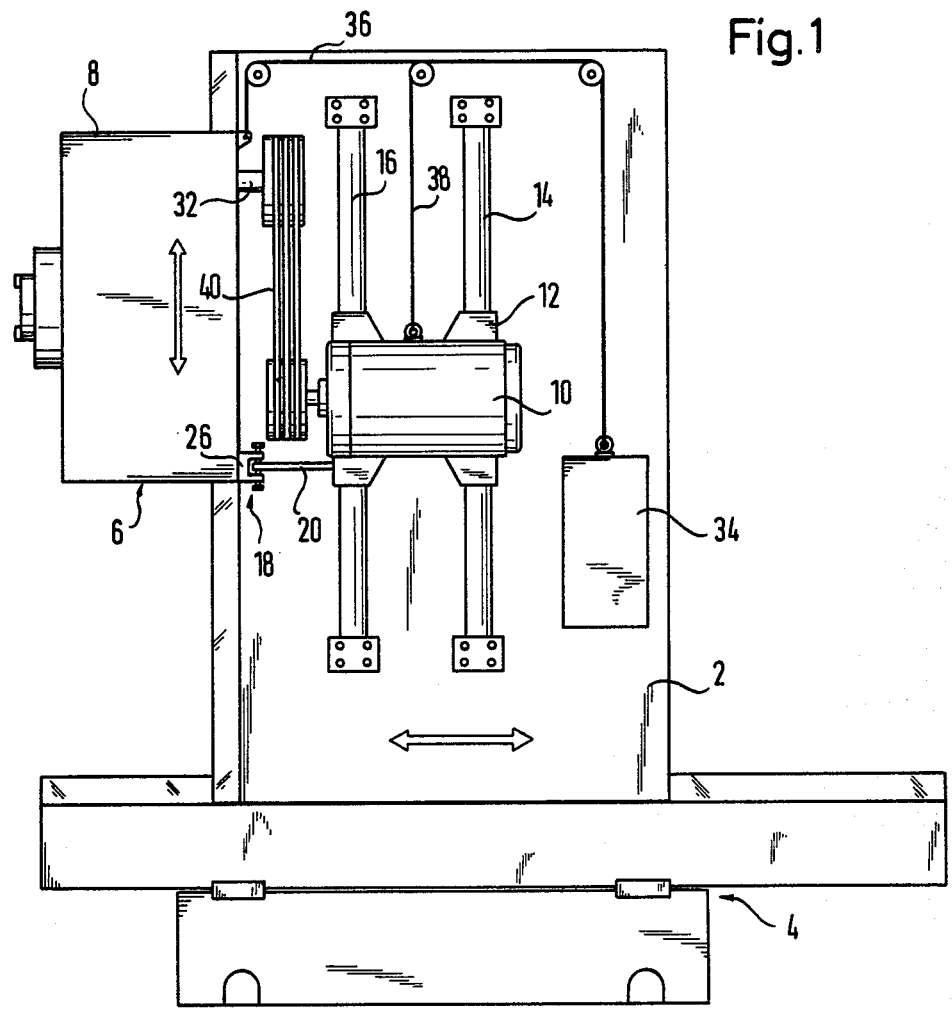
FIG. 1 is a side view of a horizontal milling and boring machine having a vertically feed movable spindlehead.

The milling and boring machine which is illustrated in FIG. 1 has a column 2, which is supported for movement in mutually perpendicular $x$ and $y$ directions on a cross slide 4.

A spindlehead 6 is mounted on the column 2 for movement in the vertical $z$-direction along first guideway means. The spindlehead 6 is composed of a headstock 8 and a spindle driving motor 10 which is movable together with said headstock 8.

The spindle driving motor 10 is secured on a motor carrier 12, which in turn is supported for vertical movement on second guideways 14, 16. The guideways are preferably constructed as ball races to assure an absolutely parallel guide without the possibility of canting.

Figure 2:
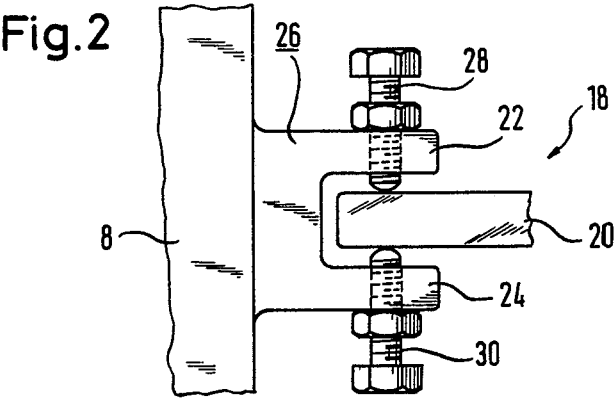
FIG. 2 illustrates in an enlarged view the carrier connection.

The motor carrier 12 is coupled to the headstock 8 through a carrier connection 18. The carrier connection 18 consists, as is particularly shown in FIG. 2, of a finger 20, which is mounted on the motor carrier and extends between two legs 22, 24 of a fork piece 26 mounted on the headstock 8. A setscrew 28, 30 is provided in each of the two legs 22, 24, which setscrew can be screwed each against the finger 20. The ends of the setscrews which engage the finger 20 are approximately semispherical, so that they rest only punctiform on the finger and create a type of a jointed connection which is capable of transmitting only forces in the vertical direction, so that, for example, a small amount of relative tilting is permitted between the motor carrier 12 and the headstock 8.

The drive connection between the spindle driving motor 10 and the input shaft 32 to the headstock 8 is a belt drive 40, which in turn does not require a highly exact alignment between the pulleys on the output shaft of the spindle driving motor and the input shaft 32 of the headstock 8.

A counterbalance weight 34 is connected through a chain 36 or 38 and is guided over guide rollers to the headstock 8 or the motor carrier 12. The weight 34 can be adjusted to the weight of the entire unit, consisting of the headstock 8 and the spindle driving motor 10. If desired, it is possible to provide both parts with a separate counterbalance weight. Then the carrier connection 18 can be released in each position of the headstock 8, because both the headstock 8 and also the spindle driving motor 10 are balanced by themselves. This has furthermore the advantage that the carrier connection is also hardly loaded during operation.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In a tool machine having a headstock with a rotatable input shaft thereon, first guideway means, means supporting said headstock for movement along said first guideway means on said tool machine and further including a second guideway means, a spindle driving motor and means supporting said driving motor for movement with said headstock along said second guideway means parallel to and separate from said first guideway means and drive means for drivingly coupling said spindle driving motor to said rotatable input shaft, at least one of said spindle driving motor and said headstock being drivable along the respective one of said first and second guideway means, the improvement comprising releasable carrier connection means for positively directly and releasably connecting said spindle driving motor to said headstock to effect a direct and positive transmission of driving force from said one of said spindle driving motor and said headstock to the other thereof and in a direction parallel to said first and second guideway means, said releasable carrier connection means including a jointed connection which transmits forces only in a direction parallel to said guideway means, said jointed connection including a fingerlike member mounted on one of said spindle driving motor and said headstock and a bifurcated piece mounted on the other of said spindle driving motor and said headstock, said fingerlike member being received between the legs of said bifurcated piece, said two legs of said bifurcated piece each having setscrews thereon having approximately semispherical free ends, said setscrews each being screwed against opposite sides of said fingerlike member, which sides face in the direction of movement of said spindle driving motor and said headstock.

2. In a tool machine having a headstock having an axially extending rotatable tool receiving spindle and a rotatable input shaft thereon, first guideway means, means supporting said headstock for movement along said first guideway means on said tool machine and further including a second guideway means, a spindle driving motor and means supporting said driving motor for movement with said headstock along said second guideway means parallel to and separate from said first guideway means, said spindle driving motor including a rotatable output shaft and drive means for drivingly coupling said spindle driving motor output shaft to said rotatable input shaft, at least one of said spindle driving motor and said headstock being drivable along the respective one of said first and second guideway means, the improvement comprising releasable carrier connection means for positively directly and releasably connecting said spindle driving motor to said headstock to effect a direct and positive transmission of driving force from said one of said spindle driving motor and said headstock to the other thereof and in a direction parallel to said first and second guideway means, said input shaft and said output shaft from said spindle driving motor being parallel and the axes thereof extending transverse of the direction of movement of said spindle driving motor and said headstock and wherein said drive means is a friction belt drive.

3. The tool machine according to claim 2, wherein said first and second guideway means are oriented so that they extend perpendicular to the direction of the spindle shaft axis on said headstock and wherein said spindle driving motor is arranged on the side of said headstock remote from said spindle shaft.

4. The tool machine according to claim 2, wherein said first and and second guideway means extend vertically and wherein said supporting means includes a counterbalance weight for at least said spindle driving motor, said counterbalance weight being connected to said spindle driving motor by a cable.

5. The tool machine according to claim 2, wherein said second guideway means includes a ball race.

6. The tool machine according to claim 2, wherein said releasable carrier connection means includes means for simultaneously permitting a small amount of tilting between said spindle driving means and said headstock.

7. In a tool machine having a headstock with a rotatable input shaft thereon, first guideway means, first means directly supporting said headstock for movement along said first guideway means on said tool machine and further including a second guideway means, a spindle driving motor and second means, separate from said first means, directly supporting said driving motor for movement with said headstock along said second guideway means parallel to and separate from said first guideway means and drive means for drivingly coupling said spindle driving motor to said rotatable input shaft, at least one of said spindle driving motor and said headstock being drivable along the respective one of said first and second guideway means, the improvement comprising releasable carrier connection means for positively directly and releasably connecting said spindle driving motor to said headstock to effect a direct and positive transmission of driving force from said one of said spindle driving motor and said headstock to the other thereof in a direction parallel to said first and second guideway means, said first and second guideway means extending vertically, said headstock and drive motor supporting means including a counterbalance weight and cables, said counterbalance weight being connected to said spindle driving motor and said headstock by said cables.

8. The tool machine according to claim 7, wherein said drive means includes a belt drive.